United States Patent [19]

Issel

[11] Patent Number: 4,735,095
[45] Date of Patent: Apr. 5, 1988

[54] HOLLOW CONDUIT FOR USE IN DETERMINING CONCENTRATION PROFILES OF LIQUID OR GASEOUS MATERIALS

[76] Inventor: Wolfgang Issel, Stösserstrasse 6a, D-7500 Karlsruhe 21, Fed. Rep. of Germany

[21] Appl. No.: 382

[22] Filed: Dec. 22, 1986

Related U.S. Application Data

[63] Continuation of Ser. No. 777,843, Sep. 19, 1985, abandoned.

[30] Foreign Application Priority Data

Sep. 19, 1984 [DE] Fed. Rep. of Germany ....... 3434322
Sep. 19, 1984 [DE] Fed. Rep. of Germany ....... 3434323

[51] Int. Cl.⁴ .................... G01N 35/00; G01N 1/26
[52] U.S. Cl. ......................... 73/864.81; 73/863.33
[58] Field of Search ............... 73/864.81, 23, 37, 40.7, 73/40.5 R, 863.33

[56] References Cited

U.S. PATENT DOCUMENTS

| | | | |
|---|---|---|---|
| 3,867,631 | 2/1975 | Briggs et al. | 73/40.7 |
| 3,964,292 | 6/1976 | Jackson | 73/40.5 R |
| 4,047,437 | 9/1977 | Brooks | 73/863.23 |
| 4,092,844 | 6/1978 | Oertle et al. | 73/23 |

Primary Examiner—Stewart J. Levy
Assistant Examiner—Robert R. Raevis
Attorney, Agent, or Firm—Antonelli, Terry & Wands

[57] ABSTRACT

The invention relates to a hollow conduit for utilization in determining concentration profiles of liquid or gaseous substances along a route, wherein the conduit provided for accommodation of a testing medium, which latter is to be moved therethrough in chronological intervals and is to be guided past a detector, is fashioned so that the substances can penetrate into the interior of the conduit. This hollow conduit consists of a material through which the substances can diffuse into the interior of the conduit. In the interior of the conduit, a hollow innner conduit 3 is provided, the wall of which has openings 5 and which consists of a compound impermeable for the substances.

5 Claims, 2 Drawing Sheets

HOLLOW CONDUIT FOR USE IN DETERMINING CONCENTRATION PROFILES OF LIQUID OR GASEOUS MATERIALS

This is a continuation of application Ser. No. 777,843, filed Sept. 19, 1985, now abandoned.

BACKGROUND OF THE INVENTION

The invention relates to a hollow conduit for use in determining concentration profiles of liquid or gaseous materials along a route, wherein the conduit provided for accommodation of a testing medium, which latter is to be moved therethrough in chronological intervals and is to be guided past a detector, is designed so that the materials can penetrate into the interior of the conduit.

German Laid-Open Application No. 2,131,907 discloses a process and apparatus, with the aid of which concentration profiles of liquid and gaseous substances can be determined along a route in a relatively simple way with high precision. This method has found application, in particular, for monitoring leakage in crude oil and long distance gas pipelines. For this purpose, a hollow conduit is laid along the route (in the form of the long-distance pipeline), this conduit being fashioned so that the materials (i.e. the escaped crude oil or gas) can enter into the interior of the conduit. Preferably, a hose of a synthetic resin is employed, allowing the materials to diffuse into the interior of the conduit. This conduit is filled with a testing medium (for example air or, alternatively, water), and the column of this testing medium is pushed through the conduit in time intervals and guided past a detector sensitive to the materials. The position and extent of a leak can thus be perfectly determined.

The possibilities of utilizing the conventional method are affected by two circumstances: on the one hand, by an adequate size of the diffusion rate of the substances to be detected through the wall of the hollow conduit for the formation of the concentration profile to be evaluated and, on the other hand, by maintaining the amplitudes of the thus-formed concentration profile during the step of passing the medium through the conduit. The problem in this connection resides in that the materials available for the hollow conduit (synthetic resins), although possessing adequate diffusion characteristics, allow the escape, by diffusion, of many of the substances that have entered by diffusion, during the passing-through step to the detector. Consequently, some substances, such as, for example, benzene and diesel oil, already have disappeared from the testing medium after a brief travel route within the hollow conduit, and do not arrive at the detector. The conventional hollow conduits made of synthetic resins are useless, due to their lack of stability, for determination of concentration profiles at high ambient temperatures as well as under the effect of ionizing radiation—as is the case, for example, in the monitoring of superheated steam conduits in nuclear power plants.

It is an object of the invention to fashion the hollow conduit so that its wall absorption is reduced without at the same time appreciably impairing the entering diffusion process and that even concentration profiles in zones of high ambient temperatures and under the effect of ionizing radiation can be determined.

In order to attain the above-described object, the starting point is a hollow conduit designed so that the substances, the concentration profiles of which are to be determined, can penetrate into the interior of the conduit, and this object is attained by providing the conduit with openings spaced apart from one another, these openings being sealed with a material through which the substances can diffuse into the interior of the conduit.

Accordingly, the invention proposes to manufacture the hollow conduit so that it is built up of two different materials, rather than, as heretofore, with a homogeneous wall. The by far larger portion of the effective wall of the novel hollow conduit includes a compound having no absorptive properties and consequently being impermeable to the substances, while in case of the smaller portion, the openings, a different material becomes effective through which the substances can diffuse and enter into the interior of the conduit (penetrate thereinto by diffusion).

Since, while passing the testing medium through the hollow conduit fashioned according to this invention, the substances diffusing into the interior of the conduit through the openings come into contact almost exclusively with the wall of the conduit, which is impermeable to the substances, the latter can practically no longer escape by diffusion so that even for determining the concentration profiles of heretofore critical materials (benzene, diesel oil), the routes to be monitored can be of a length of several kilometers.

In an advantageous embodiment of the invention, a hollow inner conduit is provided in the interior of the conduit and in the longitudinal direction of the latter, the wall of this inner conduit exhibiting the openings and being made of a material impermeable to the substances, and the conduit is made of a flexible material through which the substances can diffuse into the interior of the conduit. Such a conduit, accordingly, consists of two layers: the outer layer made of a material through which the substances can enter by diffusion, and the inner layer is made of a material permitting no entrance by diffusion and therefore lacking also any absorptive properties—but yet exhibiting a plurality of small openings through which the substances that have diffused through the outer layer can penetrate into the interior of the conduit. In other words: the impermeable conduit provided with openings is sheathed by a hose of a permeable material.

Advantageously, the cross section of all openings of a section of the inner conduit is at least fifty times smaller than the outer surface area of this section. With such dimensioning, the escape of the substances by diffusion is extremely low.

It is suitable to provide that the inner conduit is in close contact with the inner wall of the conduit.

For reasons of economical manufacture, the inner conduit can be constituted by a spirally wound strip provided with cutouts along one of its longitudinal edges. These cutouts form the required openings.

The inner conduit consists advantageously of unplasticized polyvinyl chloride, a compound having practically no absorptive properties at all.

In a second embodiment of the invention, the conduit is a rigid pipe provided with the openings, with a wall impermeable for the substances, and the openings are sealed with the material through which the substances can diffuse into the interior of the conduit.

Advantageously, plugs serve for sealing the openings, these plugs being made of the material through which the substances can diffuse.

With the proviso that the pipe constituting the hollow conduit is made of a temperature-resistant material (heat-resistant synthetic resin or metal) and the plugs are porous ceramic and/or metallic sintered elements, the arrangement of this invention can just as well be utilized advantageously for determination of concentration profiles at relatively high and at high ambient temperatures, as well as under the effect of ionizing radiation—as is the case, for example, when monitoring superheated steam pipes in nuclear power plants.

In another embodiment of the invention, the openings are sealed by a wrapping, winding around the conduit, of a strip consisting of the material through which the substances can diffuse into the interior of the conduit.

The hollow conduit can also be a metallic corrugated pipe, sleeves being inserted at spacings in this pipe, carrying the openings sealed with the plugs. Such a conduit is advantageously utilized for the monitoring of pipe elbows of super-heated steam pipes, or such conduit can be readily placed in spiral form about a straight steam pipeline.

A conduit that can be manufactured economically and is simple in handling during installation is one which includes pipe sections, with the joints of these pipe sections serving as the openings, being closed off with hose sections made of the material through which the substances can diffuse into the interior of the conduit. Such a conduit is also capable of following along curved portions.

At ambient temperatures of up to 300 degrees Celsius, the plugs, the wrapping and/or the hose section preferably consist essentially of polytetrafluoroethylene, whereas polyethylene can be utilized at low temperatures.

The invention is illustrated in the appended drawings in six different embodiments which will be described in greater detail below. In the drawings:

DETAILED DESCRIPTION

Figure 1:
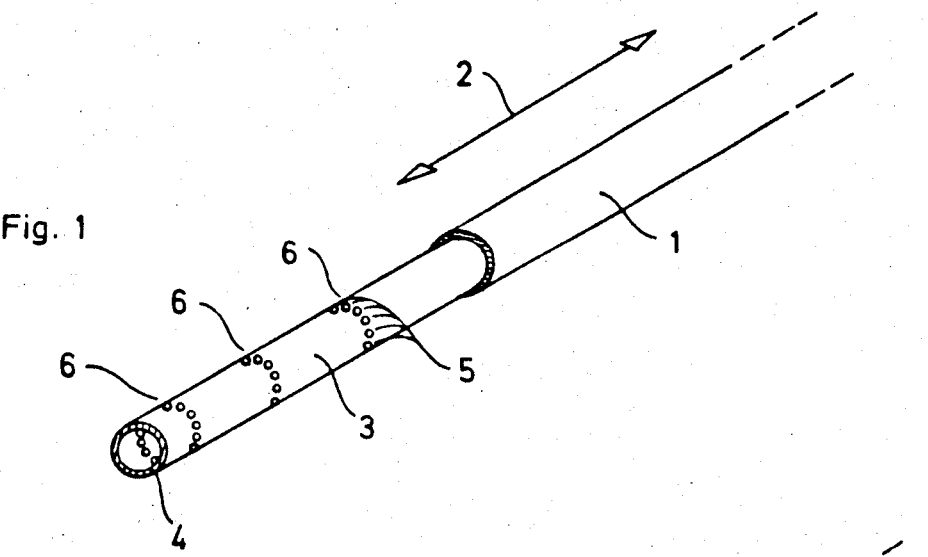
FIG. 1 is a perspective view, approximately in actual size, of a portion of a hollow conduit constructed in accordance with the present invention, with a hollow inner conduit including a plurality of rings of openings.
Figure 2:
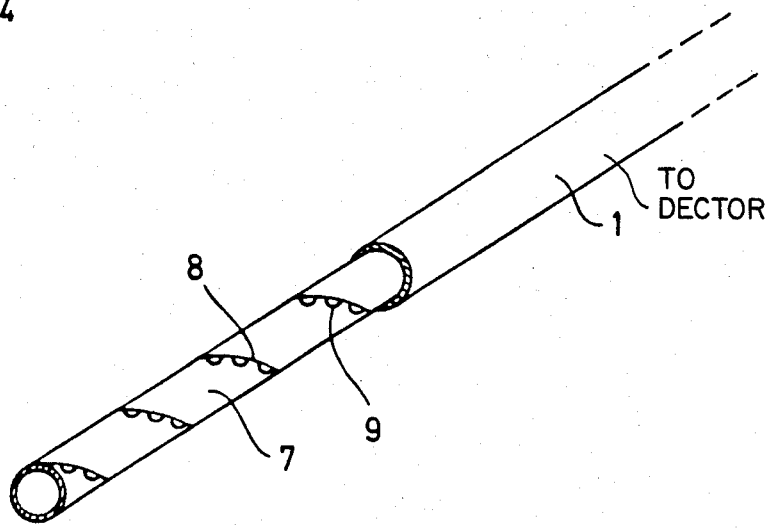
FIG. 2 is a perspective view of a portion of a hollow conduit constructed in accordance with the present invention, with an inner conduit in the shape of a strip wound in dense spirals, with the strip having cut-outs provided along a longitudinal edge thereof, with the hollow conduit being approximately actual size.

Referring now to the drawings when like reference numerals are used throughout the various views to designate like parts and, more particularly, to FIG. 1, according to this figure, a hollow conduit 1 is formed as either a flexible pipe or a flexible hose, and is made of a material through which liquid or gaseous substances, concentration profile of which is to be determined, can diffuse into the interior of conduit 1. The hollow conduit 1 preferably is made of polyethylene exhibiting a high permeability by diffusion with respect to the liquid substances such as, for example, gasoline, benzene, diesel oil, and alcohols, as well as with respect to the gaseous substances such as, for example, hydrogen, methane, ammonia, and ethylene. This hollow conduit 1 is adapted to be installed in parallel to a route of, for example, a long-distance crude oil or gas pipeline, or it is buried underground.

A hollow inner conduit 3 is coaxially arranged in the interior of the conduit 1 in the longitudinal direction 2 of the conduit 1, with the inner conduit 3 being in close contact with the inner wall of conduit 1 and being in the form of a flexible pipe and/or a flexible hose, made of a material through which the substances, the concentration profile of which is to be determined, cannot diffuse. Accordingly the inner conduit 3 preferably is made of unplasticized polyvinyl chloride, which has a very low permeability with respect to the above-mentioned liquids and gases.

The wall 4 of the inner conduit 3 is provided with many small openings 5 which can be arranged in varying patterns, with an entire cross section of all openings 5 of a specific section of the inner conduit 3 being at least fifty times smaller than the outer surface area of this section. The substances which have diffused through the hollow conduit 1 pass practically unhindered through these openings 5 into the interior of the conduit.

In the conduit 1 of FIG. 1, the openings 5 are arranged along the circumference of the inner conduit 3 in the form of belts 6. The openings 5 of the inner conduit 3 can also be arranged in rows extending in the longitudinal direction 2. Spacings are provided between the individual belts and/or between the rows as viewed in the longitudinal direction 2.

The inner conduit 3, as shown most clearly in FIG. 7, can also be made of a strip 7 of unplasticized polyvinyl chloride tightly wound in correspondence with the form of a spiral, with a tightly wound strip 7 being provided with small cutouts 9 along one of its longitudinal edges 8. However, if the strip 7 is not tightly wound, then the longitudinal edges 8 constitute a somewhat irregular, narrow, spiral gap effective as the opening 5.

Manufacturing of the suggested conduit presents no technical problems. In this context, in the embodiment of FIG. 1, the openings 5 are punched into the wall 4 of the inner conduit 3 and then the (external) conduit 1 is applied by extrusion. The conduit 1 could also be made by wrapping the inner conduit 3, equipped with the openings 5, with a strip of polyethylene. Short sections (not shown) could just as well be utilized in place of the conduit 1 extending over the entire length, with the short sections then merely covering the openings 5.

Figure 3:
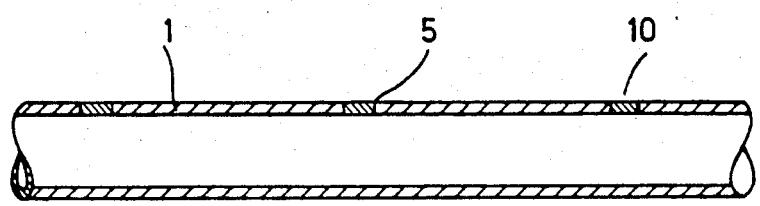
FIG. 3 is a longitudinal cross-sectional view of a hollow conduit constructed in accordance with the present invention when the openings are sealed with plugs.

In FIG. 3, a conduit 1 is made of a material impermeable for the substances, namely a smooth, commercially available metallic pipe with relatively small openings 5, arranged at spacings in the metal pipe, being sealed by plugs 10 of a material through which the substances, the concentration profile of which is to be determined, can diffuse.

The plugs 10, may be made of polyethylene, if the requirements to be met with respect to temperature resistance are not too high, but, if such requirements are higher, the plugs 10 are made of polytetrafluoroethylene. However, if the requirement includes not only very high temperature resistance but also resistance against the influences of ionizing radiation, then porous ceramic sintered elements (for example of aluminum oxide) or porous metallic sintered elements (of sintered metallic nickel or a sintered refined steel) are utilized as plugs 10.

Figure 4:
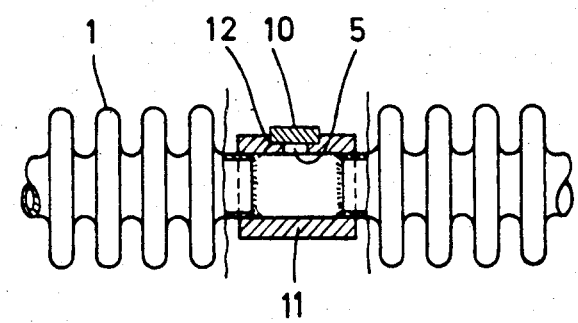
FIG. 4 is a longitudinal cross-sectional view of a portion of a hollow conduit constructed in accordance with the present invention, made of a corrugated pipe with a sleeve inserted therein, with the sleeve including an opening sealed with a plug.

The conduit 1 illustrated in FIG. 4 includes a metallic corrugated pipe in which are inserted metal sleeves 11 at intervals, with each of the sleeves 11 carrying at least one of the openings 5. All openings 5 are sealed by a plug 10 in the shape of a small, cylindrical pellet which is forced or soldered into a cylindrical trough 12 of the sleeve 11 provided for this purpose.

Figure 5:
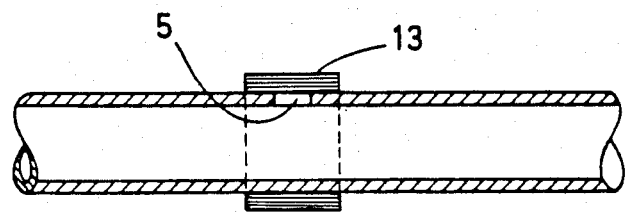
FIG. 5 is a longitudinal cross-sectional view of a portion of a hollow conduit constructed in accordance with the present invention wherein the openings are sealed by a wrapping.

FIG. 5 shows a hollow conduit 1 made of a smooth metallic pipe corresponding to the conduit in FIG. 3. The openings 5 of the metallic pipe of FIG. 5 are sealed by a wrapping 13 of a material made of a material permeable for the substances. A synthetic resin strip, especially of polyethylene or polytetrafluoroethylene, wrapped once or several times around the conduit 1, serves to produce the wrapping.

Figure 6:
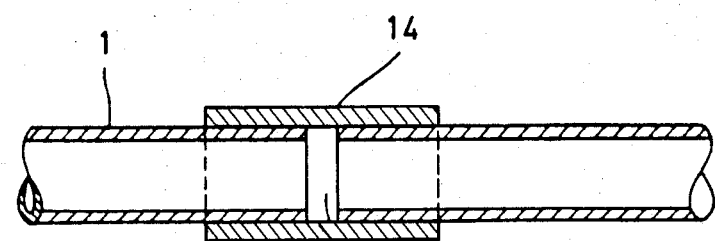
FIG. 6 is a longitudinal cross-sectional view of a portion of a hollow conduit constructed in accordance with the present invention composed of linear pipe sections, with joints of the pipe sections, forming the openings, being connected with hose sections.

The conduit 1 according to FIG. 6 includes pipe sections of an ordinary, straight metallic pipe connected by hose sections 14 of a material through which the substances, the concentration profile of which is to be determined, can diffuse. The hose sections 14 are placed on the ends of the metallic pipes so that the latter are arranged at a small spacing from each other, thereby producing openings 5 of the configuration of a circular ring. The substances can enter the interior of the conduit through these gap-like openings 5. With an equidistant arrangement of the hose sections 14, their spacing is about 50 centimeters.

I claim:

1. Hollow conduit means for determining concentration profiles of liquid or gaseous substances, said hollow conduit means being adapted to accommodate a testing medium passing through the hollow conduit means in chronological intervals and to guide the testing medium past a detector means, a hollow inner conduit means is provided in an interior of the hollow conduit means, said hollow inner conduit means extending in a longitudinal direction of the hollow conduit means, the inner hollow conduit means is made of a material impermeable to the liquid or gaseous substances and includes a plurality of openings extending in a uniform manner over an entire length of the inner hollow conduit means through which the liquid or gaseous substances can diffuse into the interior of the hollow conduit means, and wherein the hollow conduit means is produced from a flexible material through which the liquid or gaseous substances can diffuse into the interior of the hollow conduit means whereby the impermeable material reduces a flow of the gaseous or liquid substances out from the hollow conduit means during the flow of the testing medium in a concentration profile determination.

2. Hollow conduit means according to claim 1, wherein a cross-section of all openings of one section of the inner hollow conduit means is at least fifty times smaller than an outer surface area of said one section.

3. Hollow conduit means according to one of claims 1 or 2, wherein the hollow inner conduit means is in close contact with an inner wall of the hollow conduit means.

4. Hollow conduit means according to one of claims 1 or 2, wherein the hollow inner conduit means is constituted by a spirally wound strip, and wherein a plurality of cutouts are provided along one longitudinal edge of the spirally wound strips to form said openings.

5. Hollow conduit means according to one of claims 1 or 2, wherein the hollow inner conduit means consists essentially of unplasticized polyvinyl chloride.

* * * * *